(12) United States Patent  
Martegani et al.

(10) Patent No.: US 12,485,596 B2  
(45) Date of Patent: Dec. 2, 2025

(54) COMPONENT OF AN INJECTION MOLDING APPARATUS

(71) Applicant: S.I.P.A. SOCIETA' INDUSTRIALIZZAZIONE PROGETTAZIONE E AUTOMAZIONE S.P.A., Vittorio Veneto (IT)

(72) Inventors: Andrea Martegani, Conegliano (IT); Matteo Zoppas, Conegliano (IT)

(73) Assignee: S.I.P.A. SOCIETA' DUSTRIALIZZAZIONE PROGETTAZIONE E AUTOMAZIONE S.P.A., Vittorio Veneto (IT)

( * ) Notice: Subject to any disclaimer, the term of this patent is extended or adjusted under 35 U.S.C. 154(b) by 64 days.

(21) Appl. No.: 17/995,205

(22) PCT Filed: Mar. 31, 2021

(86) PCT No.: PCT/IB2021/052694  
§ 371 (c)(1),  
(2) Date: Sep. 30, 2022

(87) PCT Pub. No.: WO2021/198950  
PCT Pub. Date: Oct. 7, 2021

(65) Prior Publication Data  
US 2023/0150178 A1    May 18, 2023

(30) Foreign Application Priority Data  
Apr. 1, 2020   (IT) .......................... 102020000006865

(51) Int. Cl.  
*B29C 45/00* (2006.01)  
*B29C 45/28* (2006.01)  
(Continued)

(52) U.S. Cl.  
CPC .......... *B29C 45/2806* (2013.01); *B33Y 80/00* (2014.12); *B29C 45/00* (2013.01);  
(Continued)

(58) Field of Classification Search  
CPC ...... B29C 45/2806; B29C 45/30; B29C 45/28  
See application file for complete search history.

(56) References Cited

U.S. PATENT DOCUMENTS 3,762,849 A * 10/1973 Claes ...................... B29C 45/28  
425/588  
4,171,941 A * 10/1979 Yotsutsuji ............. B29C 45/234  
425/146  
(Continued)

FOREIGN PATENT DOCUMENTS

AU   2006201019   † 9/2007  
AU   2006201019 B2 * 9/2007 ............. B29C 45/17  
(Continued)

OTHER PUBLICATIONS

JPH-0369327 (Takeda) Mar. 1991 (online machine translation), [Retrieved on Mar. 4, 2024]. Retrieved from: Espacenet (Year: 1991).*  
(Continued)

*Primary Examiner* — Alison L Hindenlang  
*Assistant Examiner* — Andres E. Behrens, Jr.  
(74) *Attorney, Agent, or Firm* — Stetina Garred Brucker & Newboles

(57) ABSTRACT

A component of an injection molding apparatus for conveying a flow of molten plastic material from a supply channel to an injection channel coaxially crossed by a shutter, said component comprising a body provided with
- a central part crossed by a through hole defining a longitudinal axis for the passage of said shutter;
- a first bulkhead protruding from said central part, distal from an end edge of the through hole and adapted to be (Continued)

arranged at one end of the supply channel for dividing the flow of molten plastic material into two portions;

a second bulkhead and a third bulkhead, protruding in a diametrically opposite manner from said central part, separated from each other by the through hole and proximal to said end edge of the through hole, and adapted to be arranged at one end of the injection channel to accompany said two flow portions in said injection channel;

wherein the first bulkhead is arranged on the same side as the third bulkhead with respect to said central part, and wherein a first lateral surface and a second lateral surface are arranged at a first side and a second side, opposite the first side, of said first bulkhead, respectively, to accompany said two flow portions from said first bulkhead toward the second bulkhead and the third bulkhead.

13 Claims, 6 Drawing Sheets

(51) Int. Cl.
 *B33Y 80/00* (2015.01)
 *B29C 45/17* (2006.01)
(52) U.S. Cl.
 CPC .......... *B29C 45/1735* (2013.01); *B29C 45/28* (2013.01); *B29C 2045/2889* (2013.01)

(56) References Cited

U.S. PATENT DOCUMENTS

| | | | | |
|---|---|---|---|---|
| 5,149,546 A | * | 9/1992 | Nelson | B29C 45/1735 |
| | | | | 264/572 |
| 6,077,470 A | * | 6/2000 | Beaumont | B29C 45/2701 |
| | | | | 425/572 |
| 6,382,528 B1 | * | 5/2002 | Bouti | B29C 45/30 |
| | | | | 239/461 |
| 6,884,061 B2 | * | 4/2005 | Okamura | B29C 45/2806 |
| | | | | 425/557 |
| 9,028,243 B2 | † | 5/2015 | Kaushal | |
| 2002/0071888 A1 | | 6/2002 | Bouti | |
| 2004/0051195 A1 | * | 3/2004 | Okamura | B29C 45/30 |
| | | | | 264/40.5 |
| 2005/0046082 A1 | * | 3/2005 | Dewar | B29C 45/2806 |
| | | | | 425/566 |
| 2005/0046083 A1 | * | 3/2005 | Dewar | B29C 45/2896 |
| | | | | 425/566 |
| 2006/0054222 A1 | * | 3/2006 | Goinski | F16L 41/021 |
| | | | | 137/561 A |
| 2006/0082031 A1 | * | 4/2006 | Dewar | B29C 45/2711 |
| | | | | 264/328.8 |
| 2010/0183763 A1 | * | 7/2010 | Babin | B29C 45/2737 |
| | | | | 425/549 |
| 2011/0304075 A1 | * | 12/2011 | Catoen | B29C 45/84 |
| | | | | 425/562 |
| 2022/0152896 A1 | * | 5/2022 | Takehana | B29C 49/06 |

FOREIGN PATENT DOCUMENTS

| | | | | |
|---|---|---|---|---|
| CN | 204773352 | † | 11/2015 | |
| CN | 204773352 U | * | 11/2015 | |
| DE | 102018103764 | † | 4/2019 | |
| JP | H0369327 A | * | 11/1997 | ......... B29C 45/2806 |

OTHER PUBLICATIONS

JPH0369327 A (Yoshinobu) Nov. 1997 (online machine translation), [Retrieved on Aug. 2, 2024]. Retrieved from: Espacenet (Year: 1997).*
CN-204773352-U (Chen) Nov. 2015 (online machine translation), [Retrieved on Feb. 12, 2025]. Retrieved from: Espacenet (Year: 2015).*
Third Party Observations for (Family) App. EP4126495A1 https://patentscope.wipo.int/search/en/detail.jsf?docId=EP391545331&_cid=P11-M72AS9-63524-1 TIPA1 (Year: 2024).*
Patent Cooperation Treaty, International Search Report and Written Opinion for International Application No. PCT/IB2021/052694, mailed Jul. 7, 2021, 15 pages.

* cited by examiner
† cited by third party

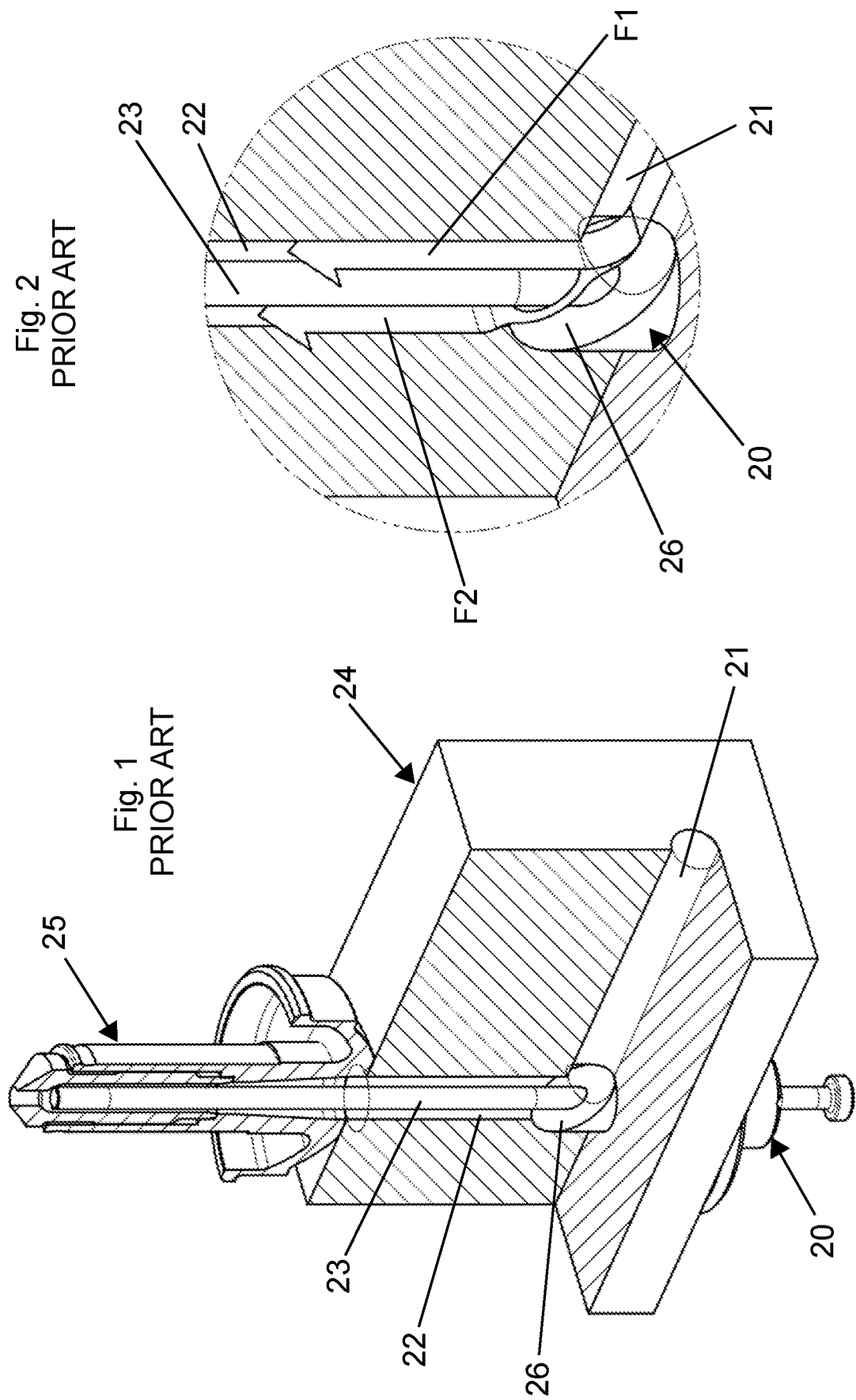

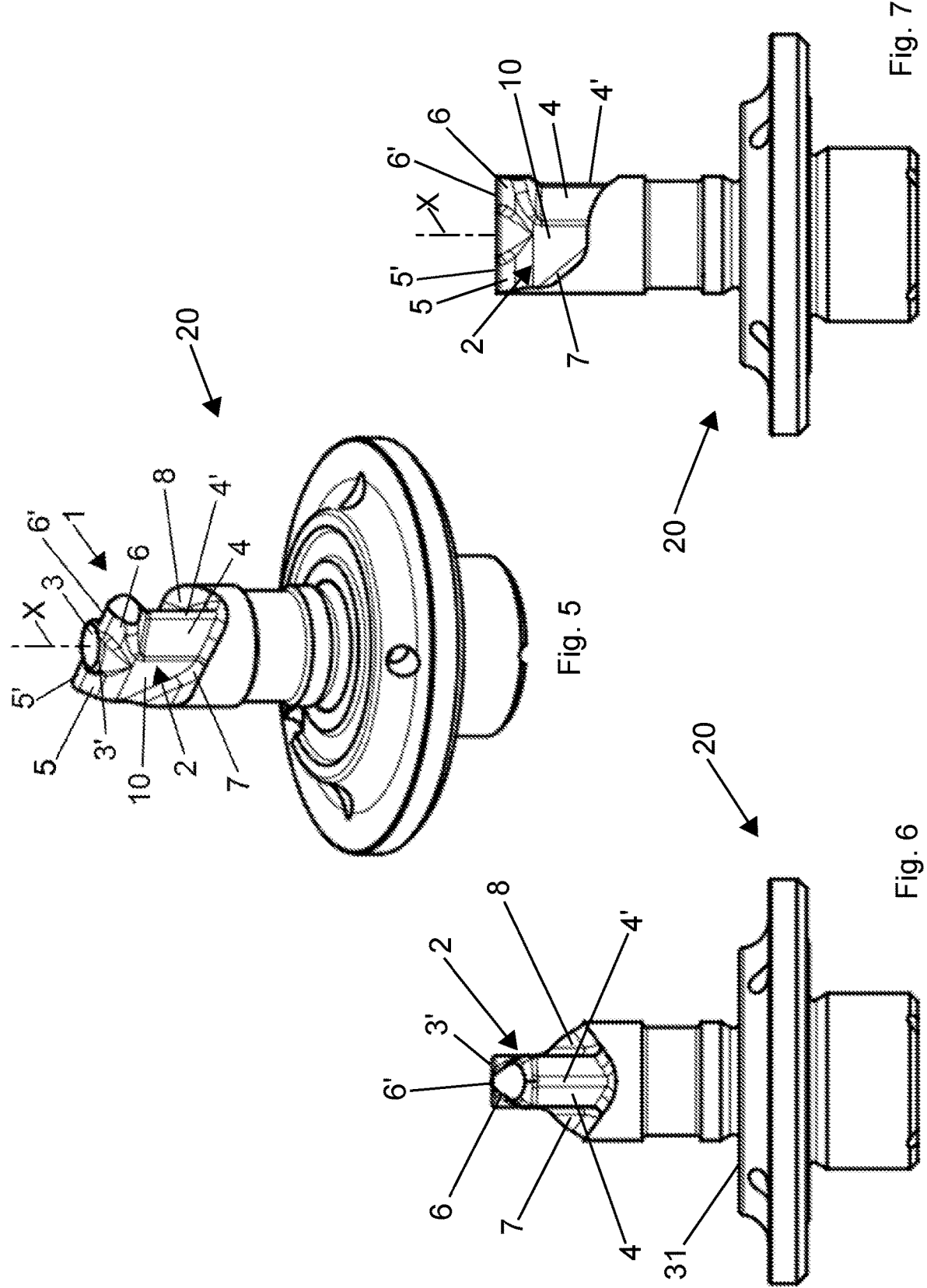

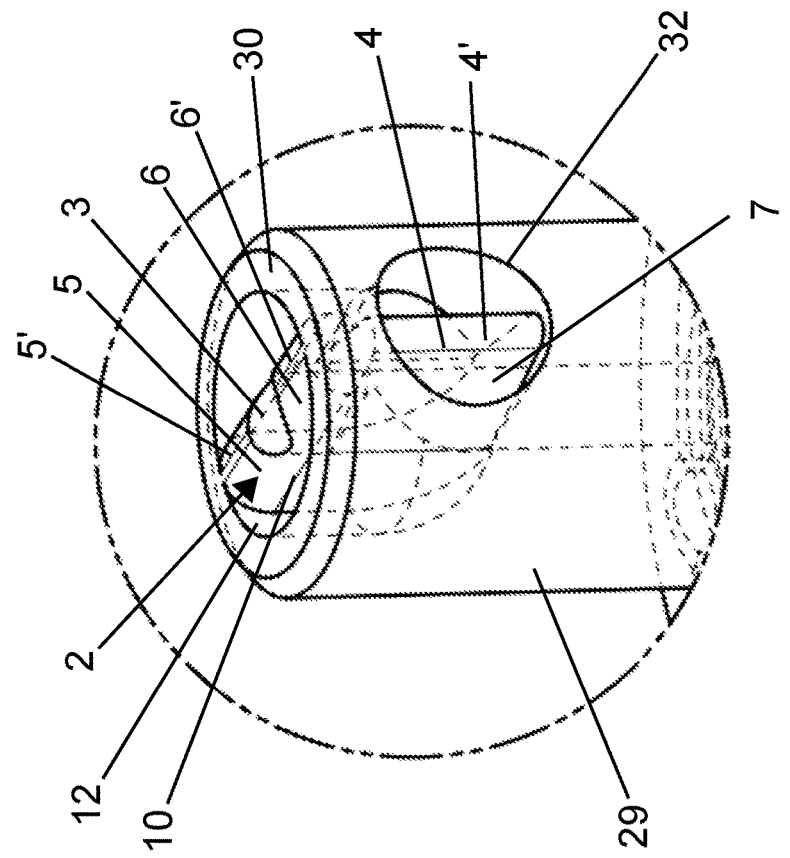
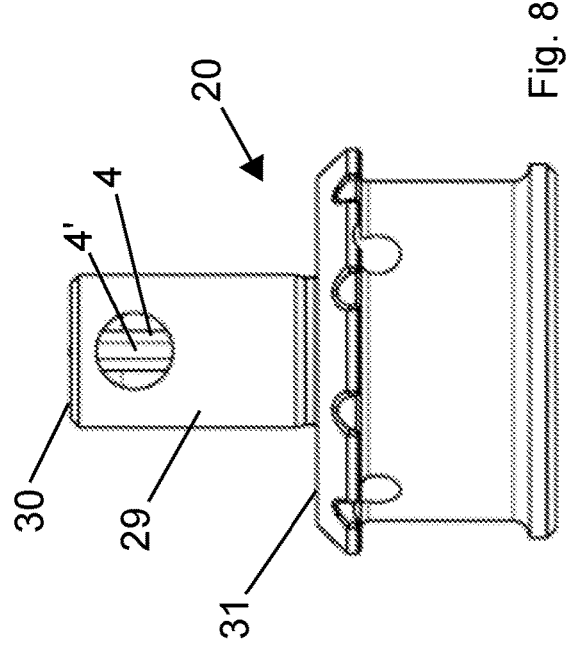
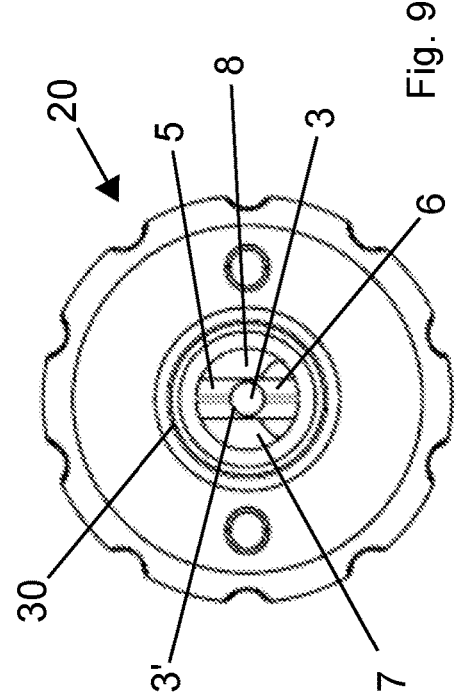

COMPONENT OF AN INJECTION MOLDING APPARATUS

CROSS-REFERENCE TO RELATED APPLICATIONS

This application claims priority to PCT International Application No. PCT/IB2021/052694 filed on Mar. 31, 2021, which application claims priority to Italian Patent Application No. 102020000006865 filed on Apr. 1, 2020, the entire disclosures of which are expressly incorporated herein by reference.

STATEMENT RE: FEDERALLY SPONSORED RESEARCH/DEVELOPMENT

Not Applicable

BACKGROUND

Field of the Invention

The present invention relates to a component of an injection molding apparatus to divert a flow of molten plastic material from a supply channel to an injection channel coaxially crossed by a shutter of an injection nozzle, said supply channel and said injection channel being transversal to each other and obtained inside a manifold of said apparatus.

Background Art

Preforms are semi-finished products made of thermoplastic material used to manufacture containers obtained, in turn, through a subsequent blow molding or stretch-blow molding process. The preforms are obtained with different processes, for example by injection molding or injection-compression molding or extrusion molding combined with further hot forming operations. In the manufacturing of containers made of plastic material, for example bottles, the preforms are typically obtained by injection molding with molds provided with a plurality of molding cavities.

Even test tubes, which unlike preforms are not blown, are typically obtained by injection molding with molds provided with a plurality of molding cavities.

As shown in FIGS. 1 and 2, a hot chamber or manifold 24 is always present in multi-cavity molds, said manifold, through appropriate channels, distributes the material from an inlet channel 21, or supply channel, to an outlet channel 22, or injection channel. Said outlet channel 22 is in communication with a respective injection nozzle 25 which injects the molten plastic material into the single molding cavity (not shown). The number of outlet channels for each hot chamber ranges from a minimum of 1 to over 20 depending on the total number of molding cavities and the arrangement thereof.

In a particular type of mold, called mold with shutter, there is provided in said outlet channel 22 a shutter 23 moved by an actuator 40, illustrated in FIG. 17, outside the hot chamber 24. The shutter 23 is held in position in axis with the outlet channel 22 by a guide body 20, also known as a thrust bearing, which has an end with an inclined plane 26 inserted into the outlet channel 22.

The movement of the shutter 23 opens or closes the communication between the injection nozzle and the molding cavity.

The molten plastic material arrives from a supply channel 21 which is transverse, generally orthogonal, to the outlet channel 22. Due to the presence of the shutter 23, the outlet channel 22 has an annular section until it reaches the gate zone. Due to this geometry, two zones with different flow speeds are created. In a first passage zone from the supply channel 21 to the outlet channel 22 the material bends and enters directly into the outlet channel 22. This first flow, indicated by F1 in FIG. 2, is said to pass "in front" of the shutter 23. In a second passage zone, before entering the outlet channel 22 the material hits the shutter 23 and divides to subsequently reunite once it has passed the shutter 23. This second flow, indicated by F2 in FIG. 2, is said to pass "behind" the shutter 23.

In the zone behind the shutter 23 the flow F2 has a significantly different speed with respect to the flow F1 in front of the shutter, thus creating stagnation zones, that is, in which the material remains for several molding cycles. This generates defects on the molded parts.

The same flow conditions are also disadvantageously generated with other geometries of shutter guide bodies which are commonly used in the field.

In products with an axis of revolution, such as preforms or test tubes, these two different flow zones create a particular defect on the back of the shutter consisting of a band of material with different features and morphology from the surrounding material. In case of a product color change, this defect zone is easily identifiable because it coincides with the line where the material with the starting color remains longer. A preform with these defects can generate non-conformities related to non-constant wall thickness in the final container, produced with the stretch-blow molding process. In the case of test tubes, which are not blown, this defect creates variations in thickness or, at the most, defects in perpendicularity and concentricity.

The need is therefore felt to provide a component of an injection molding apparatus which allows the above drawbacks to be overcome.

SUMMARY OF THE INVENTION

It is the object of the present invention to provide a component of an injection molding apparatus which allows obtaining similar speed profiles of the molten plastic material in the zones in front of and behind the shutter, ensuring greater uniformity in the flows of molten plastic material.

It is another object of the invention to provide a component of an injection molding apparatus which allows obtaining, after the stretch-blow molding of the preform, a final container having a more uniform thickness.

It is another object of the invention to provide a production process of said component.

Therefore, the present invention aims at achieving the objects discussed above by manufacturing a component of an injection molding apparatus to divert a flow of molten plastic material from a supply channel to an injection channel crossed coaxially by a shutter, said supply channel and said injection channel being transversal to each other and obtained inside a manifold of said apparatus, said component comprising a body provided with a central part crossed by a through hole, defining a longitudinal axis X, for the passage of said shutter;

a first bulkhead protruding from said central part, distal from an end edge of the through hole and adapted to be arranged at one end of the supply channel for dividing the flow of molten plastic material from said supply channel into two portions;

a second bulkhead and a third bulkhead, protruding in a diametrically opposite manner from said central part, separated from each other by the through hole and proximal to said end edge of the through hole, and adapted to be arranged at one end of the injection channel to accompany said two flow portions in said injection channel;

wherein the first bulkhead is arranged on the same side as the third bulkhead with respect to said central part, wherein at least one first lateral surface and at least one second lateral surface are arranged at a first side and a second side, opposite the first side, of said first bulkhead, respectively, to accompany said two flow portions from said first bulkhead toward the second bulkhead and the third bulkhead, wherein the first bulkhead has a first end edge, distal from the central part, and wherein the thickness of the first bulkhead gradually increases from the first end edge towards said central part.

A further aspect of the invention relates to an injection molding apparatus comprising a manifold provided internally with at least one supply channel for supplying a flow of molten plastic material, at least one injection channel which is coaxially crossed by a shutter, is arranged transversal to the at least one supply channel and is adapted to receive the flow of molten plastic material from said at least one supply channel, and a component as described above, arranged between the at least one supply channel and the at least one injection channel for diverting the flow of molten plastic material from said at least one supply channel to said at least one injection channel;

preferably in which the component is, or is obtained inside, one end of a guide body of the shutter inserted into the manifold, or is an element distinct from said guide body and inserted into a cavity of the manifold.

Another aspect of the invention relates to a manufacturing process of said component of an injection molding apparatus, wherein said component is obtained by sintering or 3D printing, or wherein the central part, the first bulkhead, the second bulkhead, the third bulkhead, the at least one first lateral surface and the at least one second lateral surface are obtained by mechanical processing from a block of metal material or from a solid cylindrical end of a guide body of a shutter of an injection nozzle.

Advantageously, the solution of the invention allows achieving a better subdivision of the flow of molten plastic material entering the injection channel.

Contrary to what occurs in the traditional solutions, the particular configuration of the component of the invention ensures that all the material is divided before entering the injection channel. Two zones are always identified: a front shutter zone F1 and a rear shutter zone F2.

From the results of the FEM analyses and the tests carried out, the particular geometry of the component ensures that the speed profiles are similar in the two aforesaid zones, thus ensuring greater uniformity in the material.

In products with an axis of revolution, such as preforms or test tubes, the new geometry of the component allows the material to be homogenized, reducing, in the zone on the back of the shutter, the problem of the band of material with different features and morphology than the surrounding material. In the case of preforms, the improvement linked to the reduction of said band of material results in a more uniform material thickness in the final container produced by the stretch-blow molding process.

The dependent claims describe preferred embodiments of the invention.

BRIEF DESCRIPTION OF THE DRAWINGS

Further features and advantages of the invention will become more apparent in light of the detailed description of preferred, but not exclusive, embodiments of a component of an injection molding apparatus disclosed by way of non-limiting example, with the aid of the accompanying drawings, in which:

FIG. 1 is a partially sectional perspective view of part of an injection molding apparatus of the state of the art;

FIG. 2 is a diagram of the two flow zones using a component of the state of the art;

FIG. 5 is a perspective view of a first embodiment of the component according to the invention;

FIG. 6 is a first side view of the component in FIG. 5;

FIG. 7 is a second side view of the component in FIG. 5;

FIG. 8 is a first side view of a second embodiment of the component according to the invention;

FIG. 9 is a top view of the component in FIG. 8;

FIG. 10 is a perspective view of the component in FIG. 8;

The same reference numbers in the figures identify the same elements or components.

DETAILED DESCRIPTION OF PREFERRED EMBODIMENTS OF THE INVENTION

With reference to FIGS. 3-16, some embodiments of a component of an injection molding apparatus according to the present invention are depicted.

As is known, an injection molding apparatus is used for the production of items, for example preforms, made of thermoplastic material, for example PET. The preforms are for example bottle preforms.

In particular, the injection molding apparatus serves to inject molten plastics through an injection nozzle 25 into a corresponding preform molding cavity (not shown) in an injection molding or injection-compression molding process.

Figure 4:
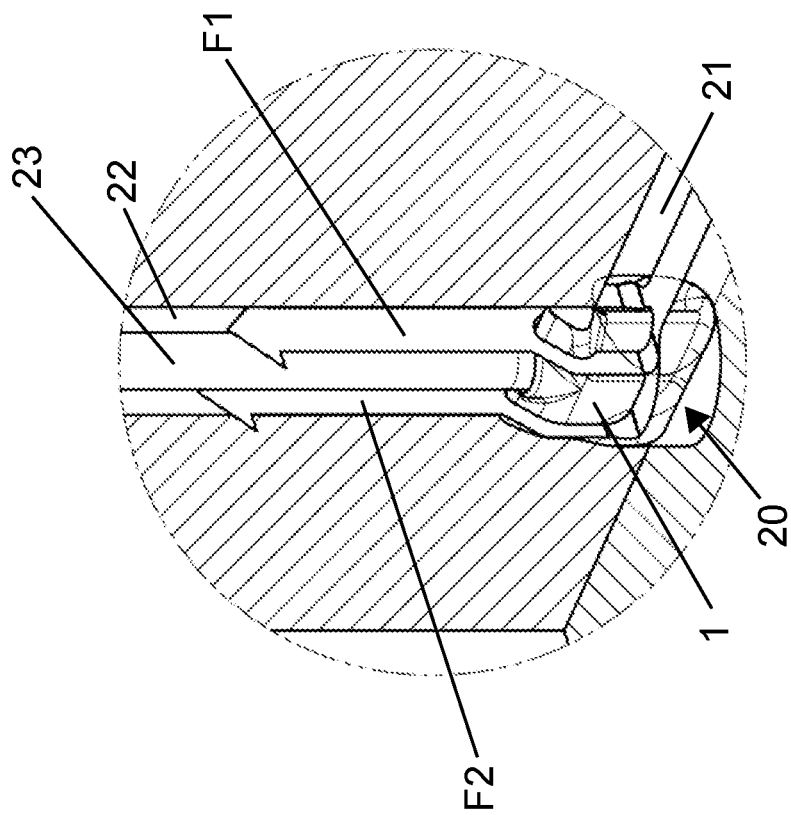
FIG. 4 is an enlargement of part of FIG. 3 with a schematization of the two flow zones.
Figure 3:
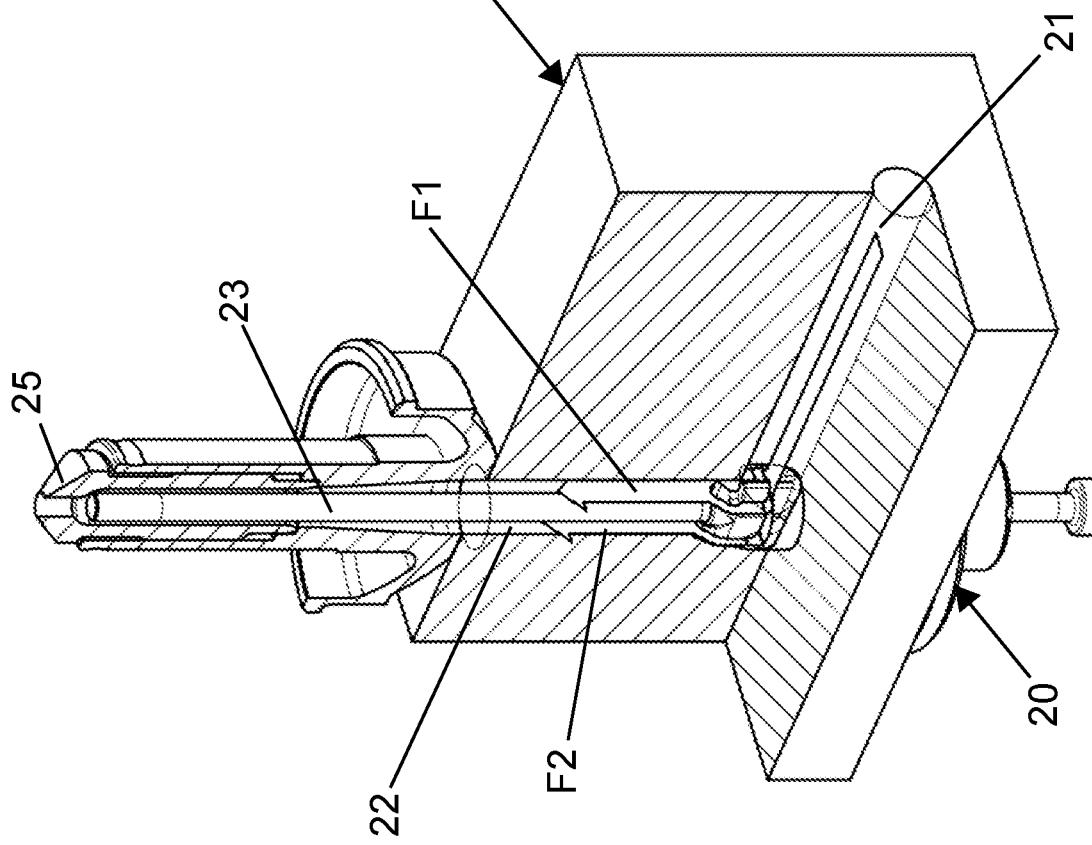
FIG. 3 is a partially sectional perspective view of part of an injection molding apparatus according to the invention.
Figure 11:
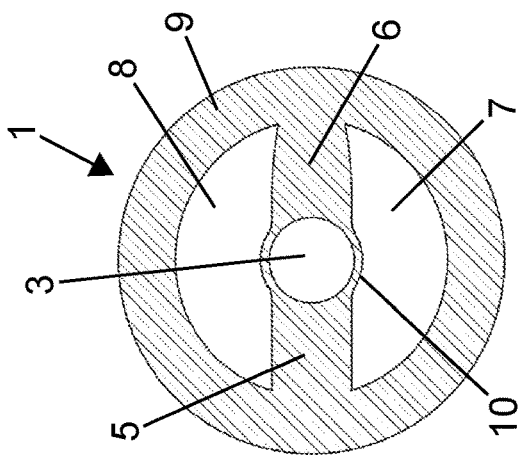
FIG. 11 is a perspective view of a third embodiment of the component according to the invention.
Figure 13:
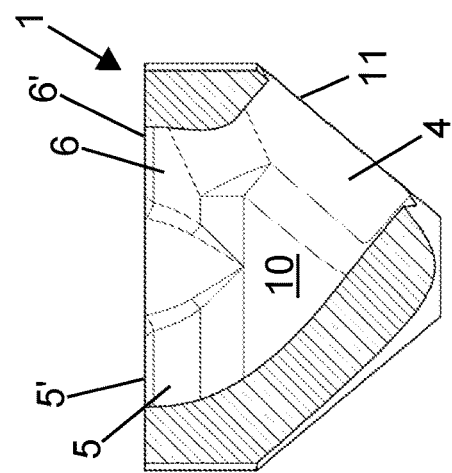
FIG. 13 is a sectional view along the plane B-B of the component in FIG. 12.
Figure 17:
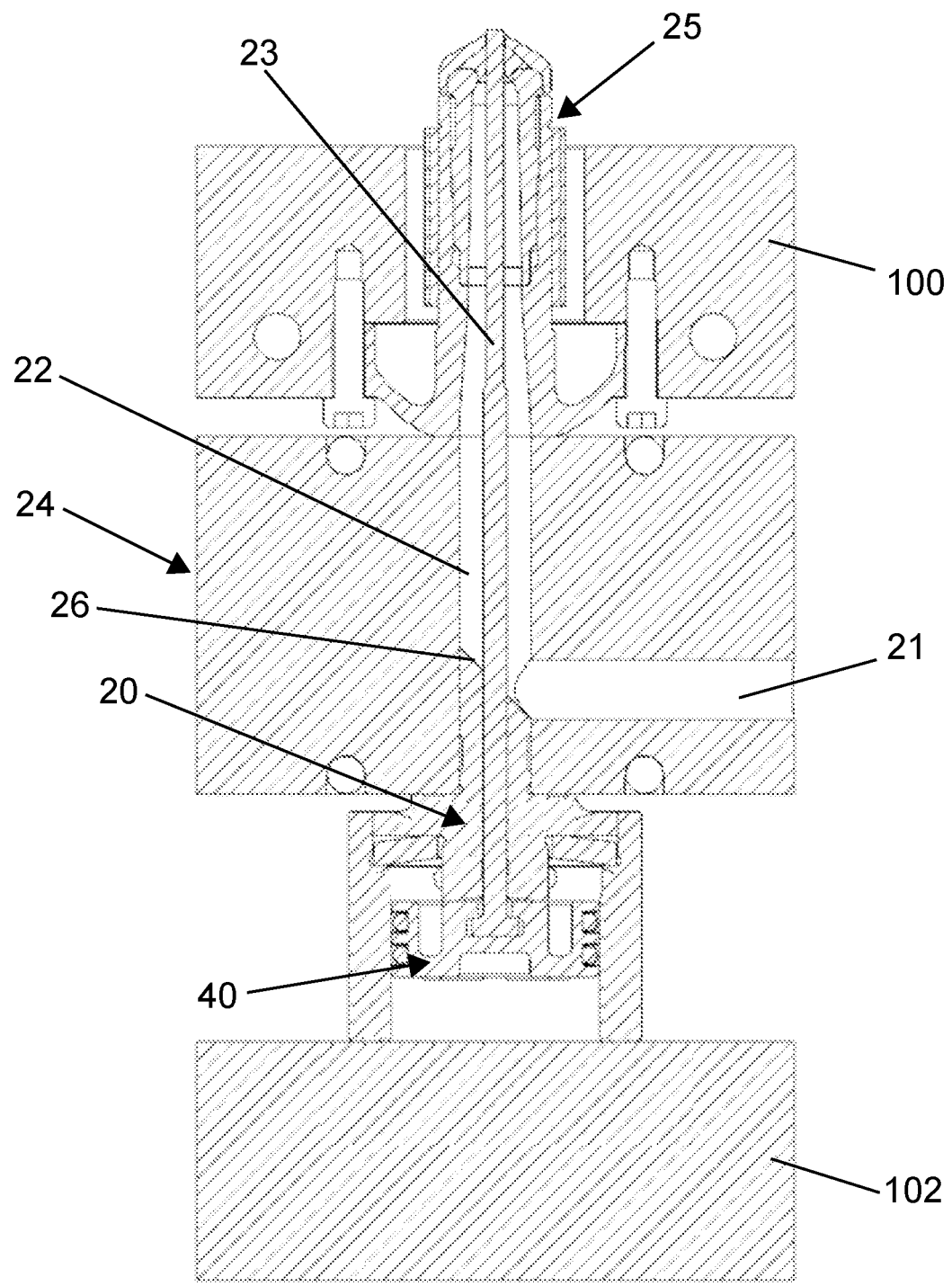
FIG. 17 is a cross-sectional view of an example of an injection molding apparatus.

In general, an injection molding apparatus comprises:
at least one injection nozzle 25 to inject molten plastics into a corresponding molding cavity;
at least one shutter 23, defining a longitudinal axis, for opening or closing the injection nozzle 25;
at least one cylinder-piston system 40 (FIG. 17) adapted to move said at least one shutter 23 from an open position of the injection nozzle to a closed position of the injection nozzle, and vice versa;

a distribution device 24 for the molten plastic material, known in the field as a manifold or hot chamber, provided with a system of channels (hot-runner) with which the molten plastic material is distributed in each molding cavity. For simplicity, only one of these channels is shown in FIG. 3.

The manifold or hot chamber 24 is arranged between a nozzle plate 100, which supports the injection nozzles 25, and a backing plate 102 which supports the cylinder-piston systems 40.

In particular, the manifold 24 is provided internally with at least one supply channel 21 for supplying a flow of molten plastic material, at least one injection channel 22 which is coaxially crossed by a respective shutter 23, is arranged transversally to the at least one supply channel 21 and is adapted to receive the flow of molten plastic material from said at least one supply channel 21, and a component 1, or flow diverter, to divert the flow of molten plastic material from said at least one supply channel 21 to said at least one injection channel 22.

In all the embodiments of the invention, shown in FIGS. 5-16, the component 1 comprises a body 2 provided with:

a central part 10 crossed by a through hole 3, defining a longitudinal axis X, for the passage of the shutter 23;

a first bulkhead 4, which protrudes from the central part 10, is distal along the axis X from an end edge 3' of the through hole 3 and is arranged at one end of the supply channel 21, i.e., at the outlet section thereof, to divide the flow of molten plastic material from the supply channel 21 into two portions;

a second bulkhead 5 and a third bulkhead 6, protruding in a diametrically opposite manner from the central part 10, separated from each other by the through hole 3 and proximal to the end edge 3' of the through hole 3, and arranged at one end of the injection channel 22, i.e., at the inlet section thereof, to accompany said two flow portions in the injection channel 22;

at least one first lateral surface 7 and at least one second lateral surface 8 arranged at a first side and a second side, opposite the first side, of the first bulkhead 4, respectively, to accompany said two flow portions from the first bulkhead 4 toward both the second bulkhead 5 and the third bulkhead 6.

As better seen in FIG. 5, the first bulkhead 4 is arranged on the same side as the third bulkhead 6 with respect to the central part 10 of the body 2; therefore, said first bulkhead 4 is arranged on the side opposite that of the second bulkhead 5. Preferably, at least one connecting surface is provided between the first bulkhead 4 and the third bulkhead 6 and between the first bulkhead 4 and the second bulkhead 5, so as to minimize any turbulence in the flows of molten plastic material.

The at least one first lateral surface 7 and the at least one second lateral surface 8 are surfaces of the body 2, which can have an inclined plane or can be at least partially curved, arranged laterally to both the first bulkhead 4 and to the central part 10 of the body 2. Preferably a first end of the lateral surfaces 7, 8 is at the first bulkhead 4, while a second end of the lateral surfaces 7, 8 is at the second bulkhead 5.

The first bulkhead 4 has an end edge 4', distal from the central part 10. Said end edge 4' can be parallel to the longitudinal axis X or inclined with respect to said longitudinal axis X by an angle other than zero, for example an angle smaller than 45°, preferably between 0.1° and 45° or between 0.1° and 20°.

The second bulkhead 5 also has an end edge 5' and the third bulkhead 6 has an end edge 6'. The end edges 5', 6' are transversal, for example perpendicular, to the longitudinal axis X. Preferably the end edges 5', 6' are aligned with each other.

In a variant the end edges 4', 5', 6' of the bulkheads lie on a same plane containing the longitudinal axis X.

In a further variant, combinable with the preceding one, the end edge 5', the end edge 6' and the end edge 3' of the through hole 3 lie on a same plane perpendicular to the longitudinal axis X.

Advantageously, the thickness of the first bulkhead 4 gradually increases from the end edge 4' toward the central part 10 of the body 2. This solution allows accompanying in a more uniform manner the two flow portions from the first bulkhead 4 toward the second bulkhead 5 and the third bulkhead 6 with the support of the at least one first lateral surface 7 and of the at least one second lateral surface 8. Optionally, the thickness of the second bulkhead 5 and the thickness of the third bulkhead 6 gradually increase from the respective end edge 5', 6' toward a zone which is at the first bulkhead 4.

Everything described above can apply to all the embodiments shown in FIGS. 5-7, 8-10 and 11-16.

A first embodiment of the invention, shown in FIGS. 5-7, refers to a component 1, in which the central part 10, the first bulkhead 4, the second bulkhead 5, the third bulkhead 6, the at least one first lateral surface 7 and the at least one second lateral surface 8, and any connecting surfaces between at least some of the elements just mentioned, are all obtained by mechanical processing starting from a solid cylindrical end of a guide body 20 of a shutter of an injection nozzle. Therefore, the component 1 represents one end of the guide body 20 of the shutter 23.

Advantageously, this first embodiment allows manufacturing a simple and compact flow deviation component 1 integrated in the guide body 20 of the shutter.

Preferably, the dimension of this component 1 along the axis X can vary from 20 to 45 mm, for example from 20 to 40 mm.

Such a guide body 20, as shown in FIG. 3, is inserted with the mechanically processed end thereof into a corresponding hole in the manifold or hot chamber 24 at a first end thereof which is distal with respect to the nozzle plate 100 and proximal to the corresponding cylinder-piston system 40. Such a hole defines therein a connecting point between the supply channel 21 and the injection channel 22. The shoulder surface 31 is the surface which abuts a lateral surface or base of the manifold 24. Thereby the component 1 is in a suitable position to divert the flow of molten plastic material from the supply channel 21 to the injection channel 22. Therefore, the paths for the two flow portions, divided by the first bulkhead 4, are obtained by providing the processed end of the guide body 20 inside the injection channel 22, at the connection thereof with the supply channel 21. Said paths are delimited partially by the processed end of the guide body 20 and partially by the inner surface of the injection channel 22.

A second embodiment of the invention, shown in FIGS. 8-10, differs from the first embodiment only in that the paths for the two flow portions, divided by the first bulkhead 4, are completely delimited, in the connecting zone between the supply channel 21 and the injection channel 22, by the processed end of the guide body 20, and not by the inner surface of the injection channel 22.

In this case the component 1 is obtained by mechanical processing completely inside the cylindrical end 29 of the guide body 20 which is inserted into the hole of the manifold or hot chamber 24 at the first end thereof which is distal with respect to the nozzle plate 100 and proximal to the corresponding cylinder-piston system 40.

Therefore, this cylindrical end 29 of the guide body 20 will be a partially hollow cylindrical end which has a circular end edge 30, defining an opening for communication with the injection channel 22.

An opening 32 is also obtained in the lateral surface of the cylindrical end 29 both for the mechanical processing of different parts of the component 1, including the bulkhead 4, and to allow the communication with the supply channel 21, once the mechanical processing has been completed and the cylindrical end 29 has been inserted into the hole of the manifold 24. The shoulder surface 31 (FIG. 8) is the surface which abuts a lateral surface or base of the manifold 24.

Advantageously, this second embodiment allows manufacturing a simple and compact flow deviation component 1 integrated in the guide body 20 of the shutter.

Preferably the dimension of the component 1, in the form of an insert, along the axis X can vary from 20 to 45 mm, for example from 20 to 40 mm.

Preferably, but not necessarily, the circular end edge 30 defines a plane also containing the end edges 5', 6' of the bulkheads 5, 6. Alternatively, the end edges 5', 6' can be in a more inner position with respect to the circular end edge 30.

Figure 12:
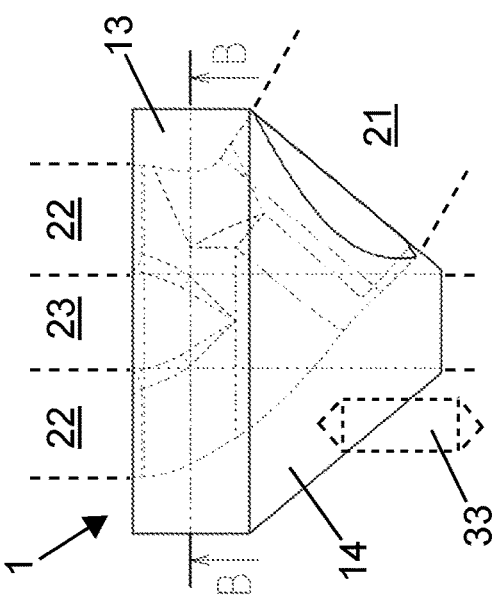
FIG. 12 is a first side view of the component in FIG. 11.
Figure 16:
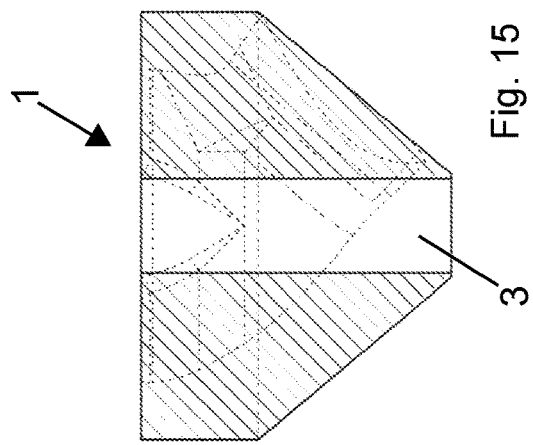
FIG. 16 is a sectional view along the plane A-A of the component in FIG. 14.
Figure 14:
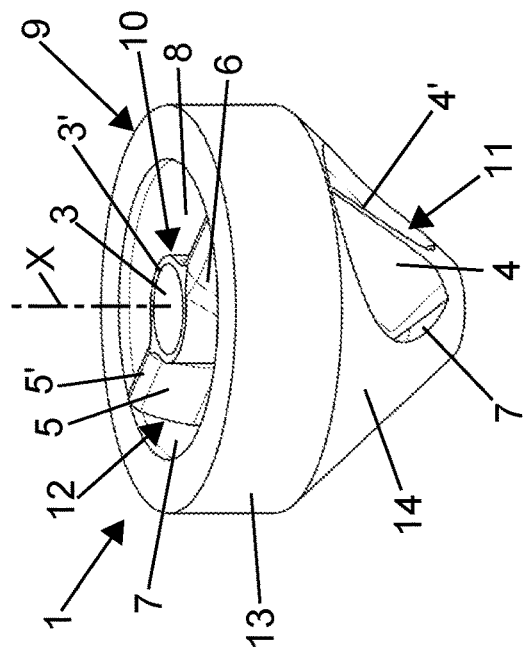
FIG. 14 is a top view of the component in FIG. 11.
Figure 15:
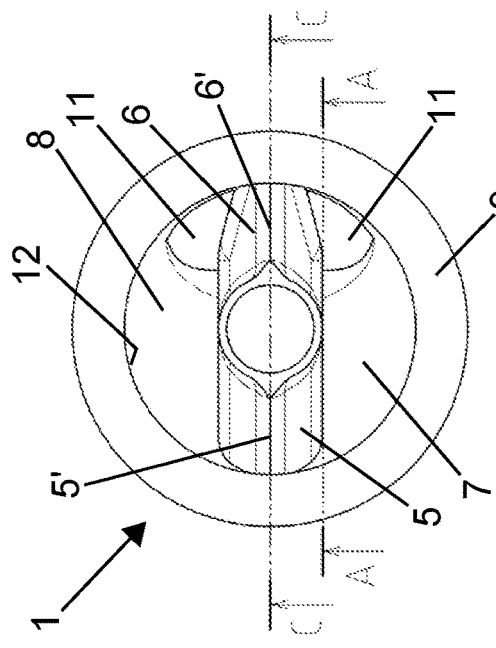
FIG. 15 is a sectional view along the plane C-C of the component in FIG. 14.

A third embodiment of the invention, shown in FIGS. 11-16, provides a component 1 entirely obtained by mechanical processing starting from a solid metal block, different from the solid cylindrical end of a guide body of a shutter of an injection nozzle. Therefore, in this case the component 1 is a distinct element from the guide body of the shutter. Such a component 1 can be inserted into a cavity of the manifold or hot chamber 24 so as to connect a supply channel 21 with an injection channel 22, the axis of which is inclined, with respect to the axis of the supply channel 21, by an angle other than 90° (FIG. 12). Such a cavity, or seat, of the manifold 24 is therefore provided at the connecting zone between the supply channel and the injection channel.

In this third embodiment the component 1 comprises a hollow peripheral part 9, coaxial to the longitudinal axis X and containing the central part 10 therein.

The hollow peripheral part 9 has a first opening 11, divided in two by the end edge 4' and adapted to communicate with the supply channel 21, and a second opening 12 divided in two by the end edge 5', by the end edge 6' and by the end edge 3' of the through hole 3, and adapted to communicate with the injection channel 22.

In this case the at least one first lateral surface 7 and the at least one second lateral surface 8 are inner surfaces of the hollow peripheral part 9.

The two paths for the respective portions of the flow of molten plastic material, divided by the bulkhead 4, are defined inside the hollow peripheral part 9, each path being delimited at least by the first bulkhead 4, by the at least one first lateral surface 7 or by the at least one second lateral surface 8, by the central part 10, by the second bulkhead 5 and by the third bulkhead 6.

Advantageously, this third embodiment allows manufacturing the flow diverter as a simple, highly compact insert, distinct from the guide body 20 of the shutter always present in the molding apparatus, such an insert being able to be inserted into a corresponding cavity of the manifold or hot chamber 24. Preferably the dimension of the component 1, in the form of an insert, along the axis X can vary from 8 to 40 mm, for example from 8 to 30 mm.

Preferably, the hollow peripheral part 9 has a cylindrical portion 13, comprising the second opening 12 and on the inner surface of which the second bulkhead 5 and the third bulkhead 6 rest, and has a truncated cone portion 14, adjacent to the cylindrical portion, comprising the first opening 11 on the lateral surface thereof. The cavity of the manifold or hot chamber 24, in which the component 1 in the form of a compact insert is inserted, can have a truncated cone shape such as to couple with the truncated cone portion 14 of the component 1.

Optionally, a housing is provided on the lateral surface of the truncated cone portion 14 to receive part of a centering pin 33, in turn arranged in the aforesaid cavity of the manifold 24.

In this variant, the at least one first lateral surface 7 and the at least one second lateral surface 8 are obtained partially on the inner surface of the truncated cone portion 14 and partially on the inner surface of the cylindrical portion 13.

In this third embodiment, the following are obtained by mechanical processing starting from a solid metal block:
- the hollow peripheral part 9 comprising the first opening 11, the second opening 12, the at least one first inner lateral surface 7 and the at least one second inner lateral surface 8;
- the inner central part 10;
- the first bulkhead 4;
- the second bulkhead 5;
- the third bulkhead 6;
- and possibly at least one connecting surface between the first bulkhead 4 and the third bulkhead 6 and between the first bulkhead 4 and the second bulkhead 5.

Alternatively, the component 1 of the invention can be obtained by sintering or 3D printing.

The invention claimed is:

1. A component of an injection molding apparatus to divert a flow of molten plastic material from a supply channel to an injection channel coaxially crossed by a shutter, said supply channel and said injection channel being transversal to each other and produced inside a manifold of said apparatus, said component comprising a body provided with
   a central part crossed by a through hole, defining a longitudinal axis, for a passage of said shutter;
   a first bulkhead protruding from said central part, distal from an end edge of the through hole and adapted to be arranged at one end of the supply channel for dividing a flow of molten plastic material coming from said supply channel into two flow portions;
   a second bulkhead and a third bulkhead, said second bulkhead and said third bulkhead protruding in a diametrically opposite manner to each other from said central part, separated from each other by the through hole and proximal to said end edge of the through hole, and adapted to be arranged at one end of the injection channel to accompany said two flow portions in said injection channel;
   wherein the first bulkhead is arranged on a same side as the third bulkhead with respect to said central part,
   wherein at least one first lateral surface and at least one second lateral surface are arranged at a first side and a second side, opposite the first side, of said first bulkhead, respectively, to accompany said two flow portions from said first bulkhead toward the second bulkhead and the third bulkhead,
wherein the first bulkhead has a first end edge which is distal from the central part,
and wherein a thickness of the first bulkhead gradually increases from the first end edge towards said central part;
wherein the second bulkhead has a second end edge and the third bulkhead has a third end edge, said second end edge and said third end edge being transversal to said longitudinal axis;
wherein a hollow peripheral part is provided, coaxial to the longitudinal axis and containing the central part therein, said hollow peripheral part having a first opening, divided in two by the first end edge and adapted to communicate with the supply channel, and a second opening divided in two by the second end edge, by the third end edge and by the end edge of the through hole, and adapted to communicate with the injection channel,
and wherein the at least one first lateral surface and the at least one second lateral surface are inner surfaces of said hollow peripheral part,
whereby two paths are defined inside the hollow peripheral part, one for each flow portion, each path being delimited at least by the first bulkhead, by the at least one first or at least one second lateral surface, by the central part, by the second bulkhead and by the third bulkhead.

2. The component according to claim 1, wherein said first end edge is parallel to the longitudinal axis or inclined with respect to said longitudinal axis by an angle other than zero, preferably less than 45°.

3. The component according to claim 1, wherein said second end edge and said third end edge are aligned with each other.

4. The component according to claim 3, wherein the first end edge, the second end edge and the third end edge lie on a same plane containing the longitudinal axis.

5. The component according to claim 3, wherein the second end edge, the third end edge and the end edge of the through hole lie on a same plane perpendicular to the longitudinal axis.

6. The component according to claim 3, wherein a thickness of the second bulkhead and of the third bulkhead gradually increases from the second end edge and from the third end edge, respectively, toward a zone which is at the first bulkhead.

7. The component according to claim 1, wherein the hollow peripheral part has
a cylindrical portion, comprising the second opening, and the second bulkhead and the third bulkhead rest on the inner surface of said cylindrical portion,
and a truncated cone portion comprising the first opening on the lateral surface thereof.

8. The component according to claim 7, wherein the at least one first lateral surface and the at least one second lateral surface are partially obtained on the inner surface of the truncated cone portion and partially on the inner surface of the cylindrical portion.

9. An injection molding apparatus comprising a manifold internally provided with
at least one supply channel for supplying a flow of molten plastic material,
at least one injection channel which is coaxially crossed by a shutter, is arranged transversal to the at least one supply channel and is adapted to receive the flow of molten plastic material from said at least one supply channel,
and a component, according to claim 1, arranged between the at least one supply channel and the at least one injection channel to divert the flow of molten plastic material from said at least one supply channel to said at least one injection channel;
preferably wherein said component is, or is obtained inside, one end of a guide body of the shutter inserted into the manifold, or is a distinct element from said guide body and inserted into a cavity of the manifold.

10. The apparatus according to claim 9, wherein said manifold is arranged between a nozzle plate, which supports injection nozzles, and a backing plate which supports actuators for moving respective shutters.

11. A process for manufacturing a component according to claim 1, wherein said component is produced by sintering or 3D printing, or wherein the central part, the first bulkhead, the second bulkhead, the third bulkhead, the at least one first lateral surface and the at least one second lateral surface are produced by mechanical processing from a block of metal material or from a solid cylindrical end of a guide body of a shutter of an injection nozzle.

12. The process according to claim 11, wherein, in the case of mechanical processing from the solid cylindrical end of the guide body, the paths for the two flow portions are obtained by inserting a processed end of the guide body inside the injection channel at the supply channel; and preferably wherein said paths are delimited partially by said processed end of the guide body and partially by the inner surface of the injection channel; or wherein said paths are completely delimited by said processed end of the guide body.

13. A process for manufacturing a component according to claim 7, wherein the hollow peripheral part comprising the first opening, the second opening, the at least one first inner lateral surface and the at least one second inner lateral surface; the inner central part; the first bulkhead; the second bulkhead and the third bulkhead are produced by mechanical processing from a solid metal block.

* * * * *